3,173,893
POLYMERIC COMPOSITIONS RESISTANT TO ULTRA-VIOLET LIGHT CONTAINING BENZOPHENONE DERIVATIVES
Joseph Fertig and Martin Skoultchi, New York, N.Y., and Albert I. Goldberg, Berkeley Heights, N.J., assignors to National Starch and Chemical Corporation
No Drawing. Filed July 31, 1962, Ser. No. 213,577
9 Claims. (Cl. 260—62)

This invention relates to polymeric compositions and to the process for their preparation, and more particularly to polymers and copolymers displaying unusual resistance to the degradative effects of ultra-violet radiation.

It is the prime object of this invention to provide polymeric compositions derived from monomeric materials whose presence imparts vastly improved light stability to the resulting polymers.

An additional object of this invention involves the preparation of polymers which withstand the effects of ultra-violet light without the necessity of their being formulated with any extraneous ultra-violet light absorbers.

The incorporation of ultra-violet light absorbers in the synthetic plastics derived from high polymers is, of course, a practice well known to those skilled in the art. Such ultra-violet absorbers are required since outdoor exposure to natural sunlight or continuous indoor exposure to fluorescent light tends to degrade most plastics and this photodegradation of plastics is, in turn, known to be caused by the ultra-violet portion of light. Such degradation is observable in a plastic as a change in color, such as a yellowing or darkening, and/or by a deterioration of its physical properties, such as its flexural strength and elongation. In an attempt to overcome these deleterious effects of ultra-violet radiation, the addition of ultra-violet absorbers or stabilizers, such as the phenyl salicylates or the ortho-hydroxy benzophenones, has of late become of considerable commercial interest. In order to be effective, such materials should be able to absorb strongly in the ultra-violet range of from 300–400 millimicrons without undergoing any change in structure. In addition, they must possess many other properties such as low color, good compatibility, heat stability, low odor, low volatility, chemical stability and chemical inertness. Furthermore, a complete lack of toxicity as well as the total absence of any migration from the formulated polymer are two important prerequisites of any ultra-violet stabilizers which are to be used in plastics or coatings which are to be employed as wrappers or containers for food products.

The ortho-hydroxybenzophenones such as 2,4-dihydroxybenzophenone; 2,2',4-trihydroxybenzophenone; and, 2,2',4,4'-tetrahydroxybenzophenone, have many advantages as ultra-violet absorbers. They are slightly yellow in color and moderately to highly effective, particularly in the range of about 380 millimicrons or higher. However, their compatibility varies depending upon the specific benzophenone compound and the plastic with which they are used.

In our copending applications Serial Nos. 202,983 and 202,984, both filed June 18, 1962, and assigned to the assignee of the present application, there are disclosed two novel classes of vinyl type monomers comprising ethylenically unsaturated derivatives of 2,4-dihydroxybenzophenone; 2,2',4-trihydroxyenzophenone; and 2,2',4,4'-tetrahydroxybenzophenone. These derivatives will, for purposes of brevity hereinafter be referred to as the ethylenically unsaturated derivatives of 2,4-dihydroxybenzophenone, since they can, in fact, all be considered as derivatives of this particular ortho-hydroxybenzophenone compound. We have now discovered that a wide variety of polymers and copolymers which are derived from these novel monomers found to be effectively stabilized against ultra-violet radiation without requiring the addition to said polymers of any extraneous ultra-violet light absorbers. The novel polymeric compositions of our invention are thus found to possess all of the many advantages, and particularly the improved light stability, which results from the utilization of extraneous ultra-violet light absorbers while managing to avoid all of the problems which are normally associated with their use. This improved light stability is imparted to these polymers as a result of the presence therein of the hydroxybenzophenone moiety which is permanently bound into and inherently part of the polymer molecules as a result of the incorporation therein of these ethylenically unsaturated 2,4-dihydroxybenzophenone monomers.

The products of our invention may thus be said to comprise those homo- and copolymers containing at least one ethylenically unsaturated 2,4-dihydroxybenzophenone derivative corresponding to the formulae:

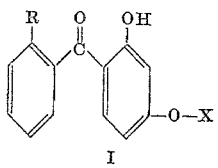 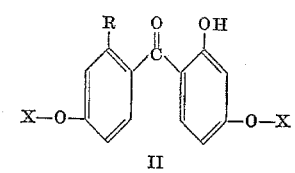

I            II wherein X represents an ethylenically unsaturated group selected from the class consisting of the beta-hydroxypropyl acrylate, i.e.

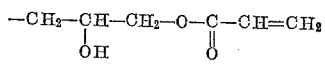

beta-hydroxypropyl methacrylate, i.e.

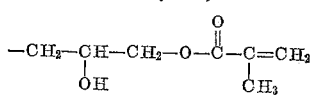

(3-allyloxy-2-hydroxy)propyl, i.e.

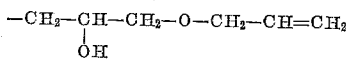

and, (2-hydroxxy) butenyl-1, i.e.

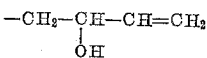

radicals and wherein R represents a radical selected from among the class consisting of hydrogen and hydroxy radicals.

As representative of the above described monomers containing the 2,4-dihydroxybenzophenone moiety, one may list the 4-acryloxy beta-hydroxypropyl ether of 2,4-dihydroxybenzophenone; the 4-methacryloxy beta-hydroxypropyl ether of 2,4-dihydroxybenzophenone; the 4-acryloxy beta-hydroxypropyl ether of 2,2',4-trihydroxybenzohpenone; the 4-methacryloxy beta-hydroxypropyl ether of 2,2',4-trihydroxybenzophenone; the 4,4'-di(acryloxy beta-hydroxypropyl) ether of 2,2',4,4'-tetrahydroxybenzophenone; the 4,4'-di(methacryloxy beta-hydroxypropyl)ether of 2,2',4,4'-tetrahydroxybenzophenone; the 4-(2-hydroxy)butenyl-1 ether of 2,4-dihydroxybenzophenone; the 4-(2-hydroxy)butenyl-1 ether of 2,2',4-trihydroxybenzophenone; the 4,4'-di(2-hydroxy)butenyl-1 ether of 2,2',4,4'-tetrahydroxybenzophenone; the 4-(3-allyloxy-2-hydroxy)propyl ether of 2,4-dihydroxybenzophenone; the 4-(3-allyloxy-2-hydroxy)propyl ether of 2,2',4-trihydroxybenzophenone; and, the 4,4'-di(3-allyloxy-2-hydroxy)propyl ether of 2,2',4,4'-tetrahydroxybenzophenone.

Thus, it is to be seen that the monomers which are essential for the preparation of the polymeric compositions of our invention may be described as mono- and difunctional ethylenically unsaturated derivatives of 2,4-dihydroxybenzophenone; or, more specifically as the mono- and di-beta-hydroxypropyl acrylate, the mono- and di-beta-hydroxypropyl methacrylate, the mono- and di-(2-hydroxy) butenyl-1, and, the mono- and di-(3-allyloxy-2-hydroxy) propyl ethers of 2,4-dihydroxybenzophenone wherein the latter substituent radicals are substituted upon the 4 or on the 4 and 4' positions of the benzophenone nucleus. As noted earlier, these derivatives will, for purposes of brevity, be referred to as the ethylenically unsaturated derivatives of 2,4-dihydroxybenzophenone, since they can, in fact, all be considered as derivatives of this particular ortho-hydroxybenzophenone compound.

The comonomers which may be utilized together with the above described ethylenically unsaturated 2,4-dihydroxybenzophenone derivatives for the preparation of the ultra-violet stable compositions of our invention can be any ethylenically unsaturated monomer such, for example, as styrene; methyl styrene; the acrylic and methacrylic acid esters of aliphatic alcohols such as methyl, ethyl, propyl, butyl, isobutyl, hexyl, 2-ethyl hexyl, octyl, lauryl and stearyl alcohols; acrylic acid; butadiene methacrylic acid; acryliamide; acrylonitrile; methacrylonitrile; vinyl propionate; dibutyl maleate; dibutyl fumarate; vinylidene chloride; vinyl chloride; vinyl acetate; ethylene; and propylene, etc. Any of these monomers may be used either alone or in combination with one another together with one or more of the benzophenone containing monomers. In order to effectively withstand the effects of ultra-violet radiation, the copolymers of our invention should contain at least 0.1%, by weight, of these ethylenically unsaturated 2,4-dihydroxybenzophenone derivatives. As for the maximum concentration, this will of course depend upon the particular comonomer as well as on the specific end use application of the resulting copolymer. However, in most cases a concentration of about 5.0%, by weight, will be fully adequate with economically useful results being obtained with a concentration in the range of about 2.0%.

As for the actual preparation of the homo- and copolymers of our invention, there may be employed any of the usual vinyl polymerization methods which are well known to those skilled in the art. Thus, they may be prepared by means of free radical initiated processes utilizing bulk, suspension, solution, or emulsion polymerization techniques; or, they may be prepared by ionic catalysts or by means of stereospecific catalysts such as those of the type developed by Ziegler.

It is to be noted, at this point, that when the 2,4-dihydroxybenzophenone derivative which is utilized in the process of our invention, is a diethylenic derivative corresponding to the above given Formula II, the resulting copolymers may, if desired, be prepared so as to be crosslinked in their configuration. Such crosslinked copolymers will possess an interlaced, two dimensional structural network as opposed to uncrosslinked copolymers which are essentially linear and one dimensional in their configuration. However, such crosslinked copolymers will be produced only in those cases wherein a sufficiently high initial concentration of the diethylenic monomer is used and the resulting copolymers have a high molecular weight. Thus, where desired, the practitioner may utilize these difunctional benzophenone derivatives of our invention as comonomers and nonetheless prepare linear, uncrosslinked copolymers merely by conducting the polymerization with a low initial concentration of the diethylenic monomer and under conditions which will lead to low molecular weight polymers.

Such methods of preparing polymers having low molecular weights are well known to those skilled in the art. These techniques include, for example, the use of chain transfer agents such as isopropanol or butyl mercaptan. In addition, the concentration of the difunctional monomer present within the reaction mixture at any given time should be kept at a minimum and this may be readily accomplished by the well known "slow addition" procedure involving the periodic addition of small portions of the difunctional monomer to the reaction system during the course of the polymerization.

In any event, the homo- and copolymers of our invention, whether linear or crosslinked, and whether prepared by means of bulk, suspension, solution, or emulsion polymerization techniques or by other means, are all characterized by their improved stability to light. This improved stability is fully equal to and in many cases superior to, the results obtained when extraneous ultra-violet light absorbers are added to the comparable polymers which do not contain these 2,4-dihydroxybenzophenone derivatives. Moreover, all of the previously described deficiencies which are inherent on the use of these extraneous stabilizers are completely avoided with the products of our invention. Thus, our novel polymeric compositions offer protection against the degradative effects of ultra-violet radiation while eliminating problems of volatility, toxicity or migration.

Our homogeneously prepared polymeric compositions can be used in any form without encountering any of the problems which may arise when it is necessary to incorporate a solid stabilizer into a polymeric material. This is especially important in those applications which require a dry product such as with molding powders wherein the uniform incorporation of an external stabilizer would require considerable heating and/or mechanical agitation. It is also advantageous in latices or emulsions wherein the incorporation of dry powders can often be troublesome or economically unfeasible. This is particularly evident in the case of polyvinylidene chloride or polyacrylonitrile latices where, with few exceptions, the polymers are incompatible with additives. Synthetic rubber, and other latices where the resulting polymer is crosslinked, are further illustrations of systems in which it is difficult to provide for the effective post-addition of ultra-violet stabilizers especially where the final product is used in the form of a latex.

There are several different techniques by which the homo- and copolymers of our invention may be utilized. Thus, where possible, they may be directly fabricated into such forms as coatings, films, sheeting and other solid shapes which may then be further fabricated into various industrial and consumer articles. On the other hand, our products may also be physically blended with a wide variety of polymers and these blends may then be used as desired. Another approach involves the coating of films or lamination of free films of our compositions to various polymeric substrates, these films thereby serving to protect said substrates from the effects of ultra-violet radiation. For example, films derived from copolymers of our benzophenone monomers with acrylate or methacrylate esters may be applied over cellulosic plastics or over surface coatings such as spar varnishes so as to enhance their aging properties. Or, alternatively, such copolymers may, if compatible, be directly blended with the cellulosics or spar varnishes and thereby impart the advantages of the compositions of our invention to these materials.

Illustrative of some widely use plastics which require the use of ultra-violet stabilizers are polyesters, polystyrene, polyvinyl chloride, polyethylene and polyvinylidene chloride. Polyesters, namely, the unsaturated polyesters having ethylenic unsaturation resulting from the presence of alpha, beta-unsaturated carboxylic acids such as maleic and fumaric acid, are typically formulated with monomeric styrene or methyl methacrylate and, in conjunction with fiber glass reinforcement, are employed in the preparation of corrugated and flat sheeting products. The latter are used as roofings, awnings, walk coverings, glazing for windows, skylights, etc. Another large volume outlet for polyester resins is in the construction of plastic boats. Most of these applications require outdoor exposure durability. However, unless they are stabilized, the polyester resins tend to yellow and physically deteriorate. In overcoming this poor stability on the part of the polyester resins, the practitioner need merely introduce one of the above described benzophenone monomers together with the styrene or methyl methacrylate monomer, the polymerization catalyst and the unsaturated polyester. The resulting copolymerization reaction will thus result in the homogeneous, chemically bonded incorporation of the ultra-violet absorbing moiety.

Similarly, polystyrene has been recommended as a plastic for automobile reflector lights and indoor lights diffusing louvers. However, polystyrene on exposure to either natural or fluorescent light tends of discolor and crack within a short period of time. By copolymerizing styrene, with one of our 2,4-dihydroxybenzophenone derivatives, the resulting homogeneous copolymer is found to be remarkably resistant to both natural and fluorescent light.

Polyvinyl chloride and vinyl chloride copolymer film formulations tend to discolor and become embrittled when exposed to light for prolonged periods of time. Here again, the homogeneous copolymers prepared by copolymerizing with a small amount of one of our monomeric 2,4-dihydroxybenzophenone derivatives tend to minimize the undesirable properties of these polymers. These same improvements are also obtained when polyethylene copolymers are prepared according to the process of our invention; although ordinarily, polyethylene is very unstable to sunlight, becoming embrittled in a matter of months.

The following examples will more clearly illustrate the embodiment of our invention. In these examples, all parts given are by weight unless otherwise noted.

Below are given the names and structures of the ethylenically unsaturated benzophenone derivatives which were used in preparing the various copolymers described in the following examples. For purposes of brevity, these monomers will hereinafter be referred to by means of the identifying letters which precede the name of each monomer.

| Identifying Letter | Structure | Name |
|---|---|---|
| A | [structure] | The 4-acryloxy beta-hydroxypropyl ether of 2,4-dihydroxybenzophenone. |
| AA | [structure] | The 4-methacryloxy beta-hydroxypropyl ether of 2,4-dihydroxybenzophenone. |
| B | [structure] | The 4-acryloxy beta-hydroxypropyl ether of 2,2′,4-trihydroxybenzophenone. |
| C | [structure] | The 4-(3-allyloxy-2-hydroxy)propyl ether of 2,4-dihydroxybenzophenone. |
| D | [structure] | The 4,4′-di(acryloxy beta-hydroxypropyl) ether of 2,2′,4,4′-tetrahydroxybenzophenone. |
| E | [structure] | The 4-(2-hydroxy)butenyl-1 ether o, 2,4-dihydroxybenzophenone. |

EXAMPLE I

This example illustrates the preparation of one of the novel copolymers of our invention by means of a solution polymerization technique and also demonstrates the improved resistance of the resulting copolymer to the degradative effects of ultra-violet radiation.

An ethyl acetate lacquer of a methyl acrylate: monomer A copolymer was prepared by charging the following ingredients into a reactor equipped with reflux condenser as well as with means for mechanical agitation.

|  | Parts |
|---|---|
| Methyl acrylate | 100.0 |
| Monomer A | 1.0 |
| Eethyl acetate | 150.0 |
| Benzoyl peroxide | 0.5 |

Under agitation, the above mixture was then refluxed at 78° C. for a period of 6 hours whereupon it was allowed to cool and discharged from the reactor. The resulting lacquer had a resin solids content of 39.8%, by weight, indicating a conversion of 99.0%.

Films having a 3 mil wet thickness were cast from this lacquer onto glass plates. After drying, these films were then removed from the glass plates and a representative sample was used to determine the intrinsic viscosity of the copolymer, the determination being conducted in acetone at a temperature of 30° C. Other samples of these films were then exposed to the equivalent of 3 months of direct sunlight, these conditions being obtained by placing the test films at a distance of 2 feet from a mercury vapor photochemical lamp which was enclosed, together with the films, in a ventilated, light proof cabinet for a period of 72 hours.

The intrinsic viscosity of the thus exposed films was thereupon determined in order to evaluate their resistance to the effects of ultra-violet radiation. Thus, any degradation resulting from ultra-violet radiation would be indicated by a drop in the intrinsic viscosity of the copolymer, with the extent of the drop being proportional to the amount of degradation which had taken place.

As a control for this experiment, films derived from a methyl acrylate homopolymer lacquer which had been prepared under the identical conditions, as described above, which were used for the preparation of our novel copolymer were similarly exposed, with the intrinsic viscosities of these films being determined both before and after their exposure to the ultra-violet source. The results of all of these tests are presented in the following table.

| Film Sample | Initial Intrinsic Viscosity | Intrinsic Viscosity After Exposure Equivalent to 3 Months of Sunlight |
| --- | --- | --- |
| Methyl Acrylate Copolymer Contg. 1.0%, by wt., of the Ultra-Violet Stabilizing Moiety | 0.50 | 0.47 |
| Control: Methyl Acrylate Homopolymer | 0.74 | 0.21 |

The above data clearly indicate the remarkable degree of resistance to ultra-violet radiation which is imparted to the novel copolymers of our invention.

EXAMPLE II

This example illustrates the preparation of one of the novel copolymers of our invention by means of a pearl polymerization technique and also demonstrates the improved resistance of the resulting copolymer to the degradative effects of ultra-violet radiation.

The following ingredients were charged into a reactor equipped with a reflux condenser, a nitrogen inlet, and means for mechanical agitation.

| | Parts |
| --- | --- |
| Ethyl methacrylate | 100.0 |
| Monomer AA | 1.0 |
| 88% hydrolyzed, medium viscosity grade polyvinyl alcohol | 0.2 |
| Benzoyl peroxide | 0.3 |
| Water | 150.0 |

Under agitation, and while passing nitrogen gas, through the reactor the above mixture was heated to 70–75° C. After a short induction period of about 30 minutes, polymerization was initiated and heating was then continued for an additional 8 hours. The resulting copolymer pearls were then washed, filtered off from the reaction mass and dried.

Using some of the above described copolymer pearls, we prepared a solution in ethyl acetate having a resin solids content of 50%, by weight. Films having a 3 mil wet thickness were cast from this lacquer onto glass plates. After drying these films were then removed from the glass plates and representative sample was used to determine the intrinsic viscosity of the copolymer, the determination being conducted in acetone at a temperature of 30° C. Other samples of these films were then exposed to the equivalent of 3 months of direct sunlight under conditions identical to those described in Example I whereupon the intrinsic viscosity of the thus exposed films was determined.

As a control for this experiment, films derived from ethyl methacrylate homopolymer pearls which had been prepared under the identical conditions, as described above, which were used for the preparation of our novel copolymer pearls were similarly exposed with the intrinsic viscosities of these films being determined both before and after their exposure to the ultra-violet source. The results of all of these tests are presented in the following table.

| Film Sample | Initial Intrinsic Viscosity | Intrinsic Viscosity After Exposure Equivalent to 3 Months of Sunlight |
| --- | --- | --- |
| Ethyl Methacrylate Copolymer Contg. 1.0%, by wt., of the Ultra-Violet Stabilizing Moiety | 0.29 | 0.25 |
| Control: Ethyl Metacrylate Homopolymer | 0.25 | 0.16 |

The above data again clearly indicates the remarkable degree of resistance to ultra-violet radiation which is imparted to the novel copolymers of our invention.

EXAMPLE III

This example illustrates the preparation of another of our novel copolymers by means of a solution polymerization technique.

A toluene lacquer of a styrene: monomer AA copolymer, was prepared by charging the following ingredients into a reactor equipped with a reflux condenser as well as with means for mechanical agitation.

| | Parts |
| --- | --- |
| Styrene | 100.0 |
| Monomer AA | 0.5 |
| Tertiary butyl hydroperoxide | 0.5 |
| Toluene | 150.0 |

Under agitation, the above mixture was then refluxed at 110° C. for a period of 6 hours whereupon it was allowed to cool and discharged from the reactor. The resulting lacquer had a resin solids content of 37.5%, by weight, indicating a conversion of 94%. Films derived from this lacquer demonstrated greatly improved resistance to the degradative effects of ultra-violet radiation as compared with comparable films derived from a similarly prepared styrene homopolymer lacquer.

EXAMPLE IV

This example illustrates the preparation of one of the novel copolymers of our invention by means of an aqueous emulsion polymerization technique and also demonstrates the improved resistance of the resulting copolymer to the degradative effects of ultra-violet radiation.

An aqueous latex of a 90:10:0.5 vinylidene chloride: ethyl acrylate: monomer A terpolymer was prepared by charging the following ingredients into a reactor equipped with a reflux condenser as well as with means for mechanical agitation.

| | Parts |
| --- | --- |
| Vinylidene chloride | 90.0 |
| Ethyl acrylate | 10.0 |
| Monomer A | 0.5 |
| Sodium lauryl sulfate | 1.5 |
| Sodium dodecyl benzene sulfonate | 2.0 |
| Sodium bicarbonate | 0.3 |
| Sodium bisulfite | 0.2 |
| Ammonium persulfate | 0.25 |
| Water | 100.0 |

The above mixture was then refluxed at 33–55° C. for a period of 5 hours thereby resulting in a latex with a resin solids content of 50%, by weight, and an intrinsic viscosity, as determined in tetrahydrofuran at 30° C. of 0.82.

This latex was then used in the preparation of films having wet thickness of 3.0 mils, which were cast upon sheets of white paper. Various samples of these coated sheets were then exposed to the following light sources:

(A) To the equivalent of 14 hours of direct sunlight by means of the apparatus described in Example I.

(B) To 8 hours of direct sunlight.

The above described polymerization procedure was again utilized in preparing two additional copolymers which were identical in their composition to the above described copolymer with the exception that they contained, respectively, 0.25 and 1.0%, by weight of the copolymer, of monomer A. The films derived from these latices were also tested according to the above noted procedure.

As a control for these tests, similarly coated sheets were exposed under the identical conditions; however, the coatings of these control sheets were derived from a 90:10 vinylidene chloride: ethyl acrylate copolymer latex made with a recipe which was identical to that described above but which did not contain the benzophenone monomer.

The effect of the various light sources upon these resin films was determined, with respect to any color change which had occurred, by utilizing a Photovolt Reflectometer, Model #610; a device which records proportionately higher readings with the increased yellowing of the particular coatings being evaluated.

The following table presents the results of these tests. In this table, and in the tables in the subsequent examples, the reflectometer readings which are given represent the difference between the readings obtained from the freshly prepared coatings as against the readings obtained subsequent to their exposure to the light source. Thus, a higher degree of discoloration will, of course, be indicated by a higher reading.

*Reflectometer readings*

| No. | Coating Resin | Equivalent of 14 Hours of Sunlight | 8 Hours of Sunlight |
|---|---|---|---|
| Control | 90:10 vinylidene chloride:ethyl acrylate. | 35.5 | 17.5 |
| 1 | 90:10:0.25 vinylidene chloride: ethyl acrylate:monomer A. | 21.5 | 12.5 |
| 2 | 90:10:0.50 vinylidene chloride: ethyl acrylate:monomer A. | 16.5 | 6.5 |
| 3 | 90:10:1.0 vinylidene chloride: ethylacrylate:monomer A. | 7.5 | 3.0 |

The above data again serve to indicate that the novel copolymers of our invention are far superior in their resistance to the effects of ultra-violet radiation as compared with comparable polymers which do not contain the ultra-violet absorbing benzophenone moiety. Moreover, it will be noted that proportionately greater resistance is obtained as the concentration of the benzophenone monomer is increased.

EXAMPLE V

This example illustrates the preparation of another of the novel copolymers of our invention by means of an aqueous emulsion polymerization technique and also demonstrates the improved resistance of the resulting copolymer to the degradative effects of ultra-violet radiation.

An aqueous latex of a 90:10:1 vinylidene chloride: butyl acrylate:monomer B terpolymer was prepared by charging the following ingredients into a reactor equipped with a reflux condenser as well as with means for mechanical agitation.

| | Parts |
|---|---|
| Vinylidene chloride | 90.0 |
| Butyl acrylate | 10.0 |
| Monomer B | 1.0 |
| Sodium lauryl sulfate | 1.5 |
| Sodium dodecyl benzene sulfonate | 2.0 |
| Sodium bicarbonate | 0.3 |
| Sodium bisulfite | 0.2 |
| Ammonium persulfate | 0.25 |
| Water | 100.0 |

The above mixture was then refluxed at 33–55° C. for a period of 5 hours thereby resulting in a latex with a resin solids content of 50%, by weight, and an intrinsic viscosity, as determined in tetrahydrofuran at 30° C. of 0.90.

This latex was then used in the preparation of films having a wet thickness of 3.0 mils which were cast upon sheets of white paper. Various samples of these coated sheets were then exposed to the following light sources:

(A) To the equivalent of 14 hours of direct sunlight by means of the apparatus described in Example I.

(B) To 8 hours of direct sunlight.

As a control for these, similarly coated sheets were exposed under the identical conditions; however, the coatings of these control sheets were drived from a 90:10 vinylidene chloride:butyl acrylate copolymer latex made with a recipe which was identical to that described above but which did not contain the benzophenone monomer. The following table presents the results of these tests.

*Reflectometer readings*

| No. | Coating Resin | Equivalent of 14 Hours of Sunlight | 8 Hours of Sunlight |
|---|---|---|---|
| Control | 90:10 vinylidene chloride:butyl acrylate. | 33 | 16 |
| 1 | 90:10:1 vinylidene chloride:butyl acrylate:monomer B. | 5.0 | 2.5 |

The above results again clearly illustrate the superior light stability of our polymers as compared with comparable polymers which do not contain the ultra-violet stabilizing moiety.

EXAMPLE VI

This example illustrates the preparation of another of the novel copolymers of our invention by means of an aqueous emulsion polymerization technique and also demonstrates the improved resistance of the resulting copolymer to the degradative effects of ultra-violet radiation.

An aqueous latex of a 75:25:0.25 vinylidene chloride: butyl acrylate:monomer D terpolymer was prepared by charging the following ingredients into a pressurized reactor.

| | Parts |
|---|---|
| Vinylidene chloride | 75.0 |
| Butyl acrylate | 25.0 |
| Monomer D | 0.25 |
| Octyl phenoxy polyoxyethylene ethanol | 7.5 |
| Sodium lauryl sulfate | 2.0 |
| Ammonium persulfate | 0.4 |
| Water | 168.0 |

The above mixture was then maintained at a temperature of 70° C. for a period of 8 hours resulting in a latex with a resin solids content of 37.3%, by weight, and which had an intrinsic viscosity, as determined in tetrahydrofuran at 30° C. of 0.88.

This latex was then used in the preparation of films having a wet thickness of 3.0 mils which were cast upon sheets of white paper. Various samples of these coated sheets were then exposed to the following light sources:

(A) To the equivalent of 28 hours of direct sunlight by means of the apparatus described in Example I.

(B) To the equivalent of 56 hours of direct sunlight by means of the apparatus described in Example I.

The above described polymerization procedure was again utilized in preparing an additional copolymer which was identical in its composition to the above described copolymer with the exception that it contained 0.1%, by weight of the copolymer, of monomer D. The films derived from this latex were also tested according to the above noted procedure.

As a control for these tests, similarly coated sheets were exposed under the identical conditions; however, the coatings of these control sheets were derived from a 75:25 vinylidene chloride:butyl acrylate copolymer latex made with a recipe which was identical to that described above but which did not contain the benzophenone monomer. The following table presents the results of these tests.

*Reflectometer readings*

| No. | Coating Resin | Equivalent of 28 Hours of Sunlight | Equivalent of 56 Hours of Sunlight |
|---|---|---|---|
| Control | 75:25 vinylidene chloride:butyl acrylate. | 21 | 26 |
| 1 | 75:25:0.25 vinylidene chloride: butyl acrylate:monomer D. | 9 | 12 |
| 2 | 75:25:0.1 vinylidene chloride: butyl acrylate:monomer D. | 12 | 14 |

In a repetition of the above described polymerization procedure, we prepared a copolymer which was identical in its composition with the exception that monomer E rather than monomer D was utilized in order to introduce the benzophenone moiety into the resulting copolymer. The films derived from this copolymer latex again demonstrated improved resistance to the effects of ultraviolet radiation comparable to that given the above noted table.

EXAMPLE VII

This example again illustrates the preparation of one of the novel copolymers of our invention by means of an aqueous emulsion polymerization technique and also demonstrates the improved resistance of the resulting copolymer to the degradative effects of ultra-violet radiation.

An aqueous latex of a 90:10:0.5 vinyl chloride:vinyl acetate:monomer C terpolymer was prepared by charging the following ingredients into a pressurized reactor.

|  | Parts |
|---|---|
| Vinyl chloride | 90.0 |
| Vinyl acetate | 10.0 |
| Monomer C | 0.5 |
| Octyl phenoxy polyoxyethylene ethanol | 7.5 |
| Sodium lauryl sulfate | 2.0 |
| Ammonium persulfate | 0.4 |
| Water | 168.0 |

The above mixture was then maintained at a temperature of 70° C. for a period of 8 hours resulting in a latex which had a resin solids content of 37.1%, by weight, and an intrinsic viscosity, as determined in tetrahydrofuran at 30° C. of 0.50.

This latex was then used in the preparation of films having a wet thickness of 3.0 mils which were cast upon sheets of white paper. Various samples of these coated sheets were then exposed to the equivalent of 5 months of continuous sunlight by means of the apparatus described in Example I.

The above described polymerization procedure was again utilized in preparing an additional copolymer which was identical in its composition to the above described copolymer with the exception that it contained 2.0%, by weight of the copolymer, of monomer C. The films derived from this latex were also tested according to the above noted procedure.

As a control for these tests, similarly coated sheets were exposed under identical conditions; however, the coatings of these control sheets were derived from a 90:10 vinyl chloride:vinyl acetate copolymer latex made with a recipe which was identical to that described above but which did not contain the benzophenone monomer. The following table presents the results of these tests.

*Reflectometer readings*

| No. | Coating Resin | Equivalent of 5 Months of Sunlight |
|---|---|---|
| Control | 90:10 vinyl chloride:vinyl acetate | 45 |
| 1 | 90:10:0.5 vinyl chloride:vinyl acetate:monomer C. | 30 |
| 2 | 90:10:2.0 vinyl chloride:vinyl acetate:monomer C. | 25 |

In a repetition of the above described polymerization procedure, we prepared a copolymer which was identical in its composition with the exception that monomer E rather than monomer C was utilized in order to introduce the benzophenone moiety into the resulting copolymer. The films derived from this copolymer latex again demonstrated improved resistance to the effects of ultra-violet radiation comparable to that given in the above noted table.

EXAMPLE VIII

This example illustrates the preparation of one of the novel homopolymers of our invention by means of a solution polymerization technique and also demonstrates how use is made of the inherent resistance towards the degradative effects of ultra-violet radiation which is displayed by the films derived from the resulting lacquer.

An ethyl acetate lacquer of the homopolymer of monomer A was prepared by charging the following ingredients into a reactor equipped with a reflux condenser as well as with means for mechanical agitation.

|  | Parts |
|---|---|
| Monomer A | 100.0 |
| Ethyl acetate | 200.0 |
| Benzoyl peroxide | 0.5 |

Under agitation, the above mixture was then refluxed at 78° C. for a period of 8 hours whereupon it was allowed to cool and discharged from the reactor. The resulting lacquer had a resin solids content of 30.0% by weight, indicating a conversion of 100%.

The above described homopolymer lacquer was diluted, by the addition of ethyl acetate, to a solids content of 5%, by weight. A film having a wet thickness of 3 mils was then cast from this lacquer onto the surface of a 1.5 mil, dry thickness, film of a 90:10 vinylidene chloride:ethyl acrylate copolymer. The resulting laminate was then exposed to the equivalent of 14 hours of direct sunlight by means of the apparatus described in Example I.

As a control for this test, a 1.5 mil, dry thickness, free film of a 90:10 vinylidene chloride:ethyl acrylate copolymer was exposed under the identical conditions.

The following table presents the results of these tests.

*Reflectometer readings*

| No. | Test Section | Equivalent of 14 Hours of Sunlight |
|---|---|---|
| Control | Free of film of 90:10 vinylidene chloride:ethyl acrylate copolymer. | 35.5 |
| 1 | Laminate of the homopolymer of monomer A over the 90:10 vinylidene chloride:ethyl acrylate film. | 3.0 |

The above results thus serve to demonstrate how films derived from our novel ultra-violet resistant homopolymers may be used to protect other polymers from the effects of ultra-violet degradation.

Summarizing our invention is thus seen to provide a novel class of polymers which are characterized by their outstanding resistance to the normally degradative effects of ultra-violet radiation. Variations may be made in proportions, procedures and materials without departing from the scope of this invention as defined by the following claims.

What is claimed is:

1. A composition comprising a polymer of at least one ethylenically unsaturated monomer selected from the group consisting of styrene, methyl styrene, the acrylic and methacrylic esters of aliphatic alcohols, acrylic acid, methacrylic acid, acrylamide, acrylonitrile, methacrylonitrile, vinyl propionate, dibutyl maleate, dibutyl fumarate, vinylidene chloride, vinyl chloride, vinyl acetate, ethylene, and propylene together with at least one ethylenically unsaturated 2,4-dihydroxybenzophenone derivative selected from the group consisting of

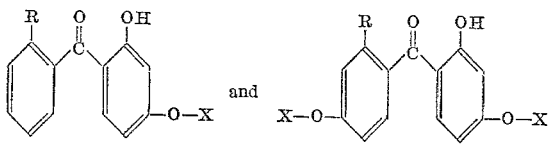

wherein X represents an ethylenically unsaturated group selected from the class consisting of the beta-hydroxypropyl acrylate, beta-hydroxypropyl methacrylate (3-allyloxy-2-hydroxy)propyl, and (2-hydroxy)butenyl-1 radicals and wherein R represents a radical selected from among the class consisting of hydrogen and hydroxy radicals.

2. The composition of claim 1, wherein said ethylenically unsaturated 2,4-dihydroxybenzophenone moiety is present in a proportion of at least 0.1%, by weight.

3. A composition in accordance with claim 2 in which methyl acrylate is polymerized with the 4-acryloxy beta-hydroxypropyl ether of 2,4-dihydroxybenzophenone.

4. A composition in accordance with claim 2 in which ethyl methacrylate is polymerized with the 4-methacryloxy beta-hydroxypropyl ether of 2,4-dihydroxybenzophenone.

5. A composition in accordance with claim 2 in which styrene is polymerized with the 4-methacryloxy beta-hydroxypropyl ether of 2,4-dihydroxybenzophenone.

6. A composition in accordance with claim 2 in which vinylidene chloride is polymerized with the 4-acryloxy beta-hydroxypropyl ether of 2,4-dihydroxybenzophenone.

7. A composition in accordance with claim 2 in which vinylidene chloride and butyl acrylate are polymerized with the 4-acryloxy beta-hydroxypropyl ether of 2,2',4-trihydroxybenzophenone.

8. A composition in accordance with claim 2 in which vinylidene chloride and butyl acrylate are polymerized with the 4-(2-hydroxy)butenyl-1 ether of 2,2',4-trihydroxybenzophenone.

9. A composition in accordance with claim 2 in which vinyl chloride and vinyl acetate are polymerized with the 4-(3-allyloxy-2-hydroxy)propyl ether of 2,4-dihydroxybenzophenone.

References Cited by the Examiner
UNITED STATES PATENTS

| | | | |
|---|---|---|---|
| 2,765,224 | 10/56 | Lambrech | 260—47 |
| 2,938,883 | 5/60 | Raich | 260—47 |
| 2,962,533 | 11/60 | Hardy et al. | 260—591 |
| 3,066,112 | 11/62 | Bowen | 260—47 |
| 3,107,199 | 10/63 | Tocker | 260—47 |

WILLIAM H. SHORT, *Primary Examiner.*